United States Patent [19]

Blizzard et al.

[11] Patent Number: 5,368,941
[45] Date of Patent: Nov. 29, 1994

[54] DEFORMABLE, ABRASION-RESISTANT SILICONE COATING AND METHOD OF PRODUCING THE SAME

[75] Inventors: John D. Blizzard, Bay City; Levi J. Cottington, Midland, both of Mich.

[73] Assignee: Dow Corning Corporation, Midland, Mich.

[21] Appl. No.: 938,065

[22] Filed: Aug. 31, 1992

[51] Int. Cl.$^5$ .......................... C08F 2/50; B32B 27/36; C08K 3/36; C08G 77/20
[52] U.S. Cl. ...................... 428/412; 522/84; 522/99; 528/26; 528/32; 528/38
[58] Field of Search ................ 522/84, 99; 528/26, 528/38, 32; 428/412

[56] References Cited

U.S. PATENT DOCUMENTS

| | | | |
|---|---|---|---|
| 4,348,246 | 7/1982 | Chung | 428/412 |
| 4,455,205 | 6/1984 | Olson et al. | 204/159.13 |
| 4,478,876 | 10/1984 | Chung | 427/54.1 |
| 4,486,504 | 12/1984 | Chung | 428/412 |
| 4,603,086 | 7/1986 | Fujii et al. | 428/447 |
| 4,697,026 | 9/1987 | Lee et al. | 556/418 |
| 4,822,828 | 4/1989 | Swofford | 522/84 |

FOREIGN PATENT DOCUMENTS

| | | |
|---|---|---|
| 0408047A2 | 7/1990 | European Pat. Off. |
| 0424645A2 | 9/1990 | European Pat. Off. |
| 0437327A2 | 1/1991 | European Pat. Off. |

*Primary Examiner*—Susan Berman
*Attorney, Agent, or Firm*—Arnie R. Jarnholm

[57] ABSTRACT

A deformable, abrasion-resistant coating is formulated from at least one multi-functional acrylate monomer, at least one aminofunctional silane, colloidal silica and at least one acrylate-terminated polyalkylene oxide. The acrylate-terminated polyalkylene oxide helps prevent gelling of the coating composition during stripping and also imparts the composition with deformability, without sacrificing abrasion resistance. Accordingly, the coating composition of the invention can be applied over and cured on an embossable substrate and the substrate can then be embossed, without causing the coating of the invention to crack or spall.

12 Claims, 2 Drawing Sheets

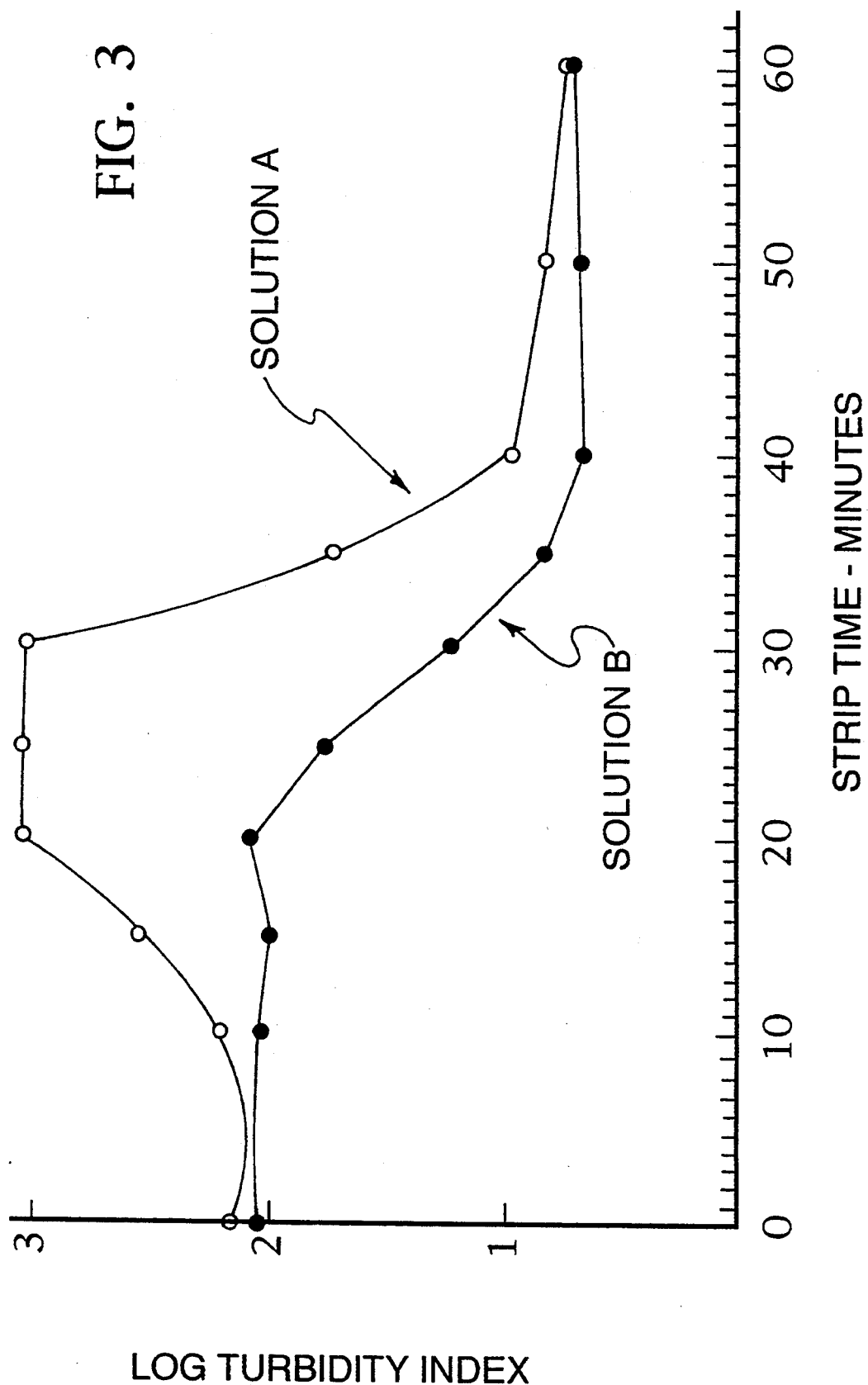

DEFORMABLE, ABRASION-RESISTANT SILICONE COATING AND METHOD OF PRODUCING THE SAME

BACKGROUND OF THE INVENTION

1. Field of the Invention

The present invention relates generally to abrasion-resistant coatings axed more particularly to such coatings that also are deformable. The coatings of the invention have sufficient deformability so that substrates coated therewith can be subsequently embossed.

2. Background of the Prior Art

Numerous compositions for forming abrasion-resistant coatings on various types of substrates are well-known in the art.

Silicone compositions of the above type are disclosed in U.S. Pat. No. 4,455,205 to Olson et al. (issued Jun. 19, 1984 and assigned to General Electric Company, Schenectady, N.Y.) The coatings comprise an ultraviolet light curable composition prepared from a multifunctional acrylate monomer, an acryloxyfunctional silane and aqueous colloidal silica in a polar solvent. After mixing the components, the solvent and remaining water is removed in vacuo, with gentle heating, a step which is termed "stripping." A photoinitiator is then added and the composition is cured.

Similarly, U.S. Pat. No. 4,486,504 to Chung, (issued Dec. 4, 1984 and also assigned to General Electric Company) discloses an ultraviolet light curable composition prepared from the addition of a multifunctional acrylate monomer to a mixture of acryloxyfunctional silanes, and/or glycidoxy functional silanes and aqueous colloidal silica. After stripping, a photoinitiator is added and the composition cured.

Such abrasion-resistant coatings are frequently applied over polycarbonate substrates. The coated substrates are often used as a substitute for glass, as in the case of lenses for automobile head lamps. In these applications, where there is little or no flexure or deformation of the coated substrate, the coating compositions of the prior art generally perform quite well, providing a scratch-resistant, transparent coating.

The prior art coating compositions have several drawbacks, however, relating to performance and ease of formulation.

When there is a need for repeated flexure or plastic deformation of the coated substrate, the prior art compositions tend to craze, crack and spall. This results in an unsightly surface finish and may leave the substrate unprotected.

A deformable, abrasion-resistant coating would be very useful in the production of electronic switch pads, such as those used in modern cash registers and the like. An embossing process is used on a polycarbonate sheet to delineate the various key positions. The embossed sheet is subjected to repeated flexure from manual depression that is employed to actuate electronic switches located below the key positions.

Because compositions for forming an abrasion-resistant coating are generally applied as a liquid that is subsequently cured, the polycarbonate sheet must be coated prior to embossing or a uniform coating of desired thickness cannot be achieved.

The abrasion-resistant coatings of the prior art are not deformable and generally behave in a brittle manner during embossing. Even those prior art coatings that survive embossing frequently wear at an excessive rate or crack or spall upon repeated flexure of the substrate.

Another drawback associated with the prior art abrasion-resistant coatings is the difficulty of formulation. For instance, in formulating the coating composition as taught in the above-mentioned U.S. Patent to Chung, the present inventors found that, upon stripping, the admixture of the components had a strong tendency to gel. This rendered a final product having a viscosity too high to produce an abrasion-resistant coating of optimum thickness or one wherein the colloidal silica agglomerated, yielding a chalky, nontransparent coating.

The present inventors have overcome the drawbacks of the prior art by providing a novel composition which forms a transparent, adherent, deformable and abrasion-resistant coating upon curing. Furthermore, the method of the present invention for formulating the composition avoids the gelling problems associated with the prior art compositions.

BRIEF SUMMARY OF THE INVENTION

In accordance with the present invention there is provided a novel composition which upon curing, forms a deformable, abrasion-resistant coating on a substrate. As used herein and as more fully explained below, the term "deformable" means the ability of the cured coating composition to withstand at least about 5% elongation, without any visible cracking, as measured in accordance with a guided bend test. Likewise, the term "abrasion-resistant," when used to describe cured coating compositions within the scope of the invention, means a composition which exhibits a Taber 100 number (T-100) of about 5 or less, and preferably about 2 to 3, and a Taber 500 number (T-500) of about 10 or less and preferably about 5 to 8.

The composition of the invention comprises:
(A) at least one multifunctional acrylate monomer;
(B) an aminofunctional silane having the following formula:

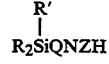

wherein
  R is an alkoxy or alkyl group having 1 to 4 carbon atoms, which R groups may be the same or different;
  R' is an alkoxy group;
  Q is a divalent hydrocarbon group; and
  Z is hydrogen or a monovalent hydrocarbon group;
(C) colloidal silica; and
(D) one or more acrylate-terminated polyalkylene oxides.

The multifunctional acrylate monomer (A) is present in an amount greater than a two-to-one Michael adduct equivalency with respect to the amninofunctional silane (B). This ensures that the Michael addition reaction between components (A) and (B) goes to substantial completion and that residual acrylate will be present for further polymerization upon curing the composition.

The chemical structure and amount of acrylate-terminated polyalkylene oxides, component (D), are chosen to impart the property of deformability to the cured composition of the invention, without sacrificing abrasion-resistant properties. This is accomplished by limiting the acrylate-terminated polyalkylene oxides to monomers having a predetermined mean number of carbons between the acrylate terminals and limiting the range of component (D) to a predetermined weight percent, relative to the aggregate weights of components (A), (B) (C) and (D).

In the method of the present invention, components (A) and (B) are dissolved in a polar solvent and the Michael addition reaction is allowed to proceed to substantial completion. An acid is then added to the Michael adduct to neutralize residual alkalinity due to the presence of the aminofunctional groups in component (B). Thereafter, component (C), colloidal silica (which is added in the form of a liquid dispersion), and component (D), the acrylate-terminated polyalkylene oxides, are mixed with the acid-neutralized solution containing the Michael adduct. As a final step, the composition is stripped of the desired amount of "volatiles," i.e. the polar solvent and the liquid dispersant in the colloidal silica.

By acid-neutralizing the residual alkalinity of the solution containing the Michael adduct before adding the colloidal silica thereto, gelling of the solution or precipitation of the silica from colloidal dispersion is prevented. Furthermore, by adding the acrylate-terminated polyalkylene oxides to the solution before stripping, the tendency of the solution to gel during the stripping step is greatly reduced.

The composition of the invention is cured by conventional means, preferably by the use of a photoinitiator and ultra violet radiation. Likewise, the composition of the invention is applied to substrates by known methods such as flow coating, dip coating, spin coating, spray coating or curtain coating. Coating thicknesses between 3-25 microns, and preferably about 5 microns, are recommended. When the composition of the invention is applied to a deformable substrate (such as polycarbonate sheet) and cured, the substrate can be subsequently embossed, resulting in a novel article of manufacture.

It is therefore an object of the present invention to provide a novel composition for forming a deformable, abrasion-resistant coating on a substrate.

It is another object of the present invention to provide a method of formulating the composition of the invention wherein the tendency of the composition to gel upon stripping is greatly reduced.

Yet another object of the invention is to provide a novel article of manufacture, which article comprises a substrate sheet having an abrasion resistant coating formed thereon and which coated substrate may thereafter be embossed.

These and other objects of the invention, as well as numerous features and advantages, will become apparent from the following detailed description, claims and drawings, of which:

FIG. 1 is a schematic, plan view of a polycarbonate sheet wherein: one half of the sheet is illustrated as being coated with an abrasion-resistant coating composition outside the scope of the present invention; the other half of the sheet is illustrated as being coated with an abrasion-resistant coating composition within the scope of the present invention; and the sheet is illustrated as being subsequently embossed to form an electronic key pad;

FIG. 2 is a magnified, partial cross-sectional view of the coated and embossed polycarbonate sheet schematically illustrated in FIG. 1, taken along the line 2—2, looking in the direction of the arrows; and FIG. 3 is a graph of $\log_{10}$ turbidity index versus time, during stripping, for identical compositions of the invention but with and without the addition of the acrylate-terminated polyalkylene oxide prior to stripping.

DETAILED DESCRIPTION OF THE INVENTION

Figure 1:
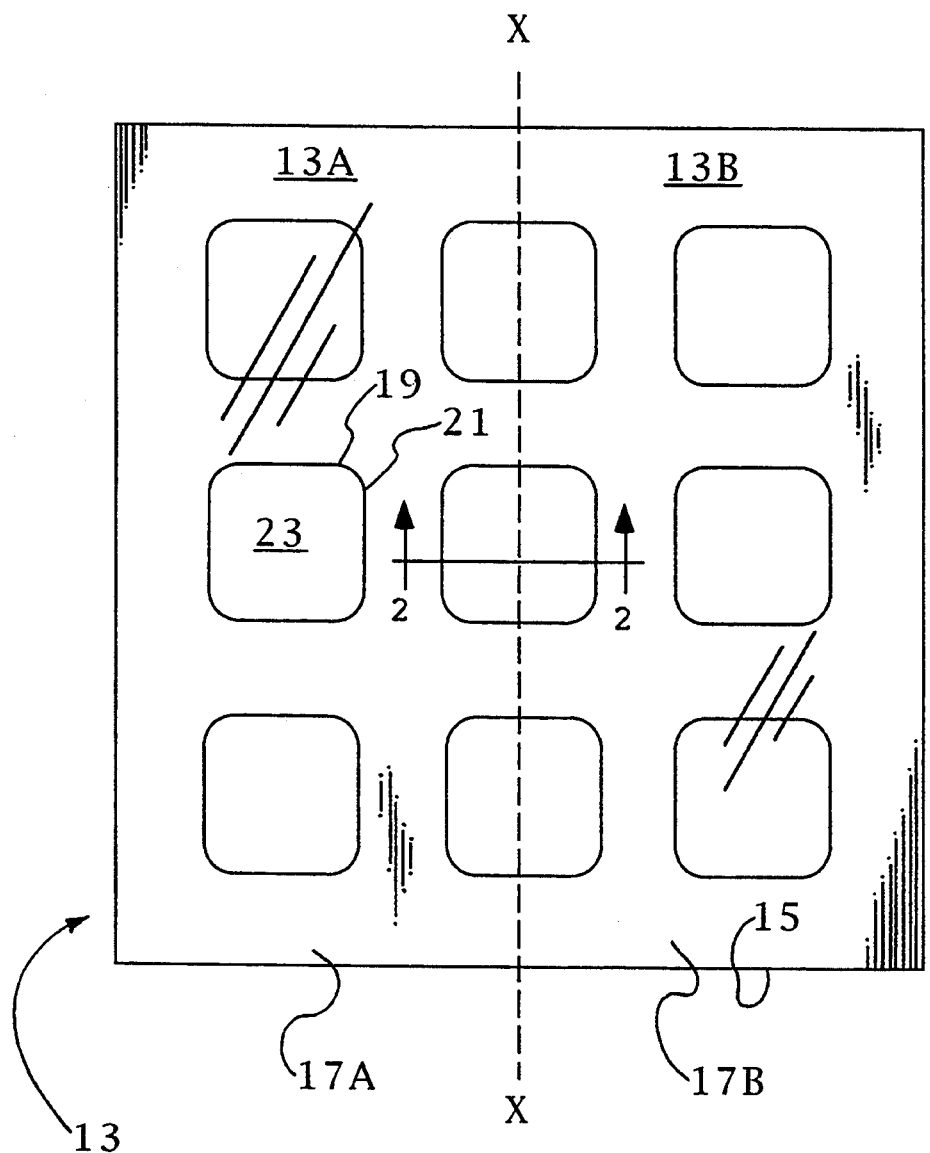
Figure 2:
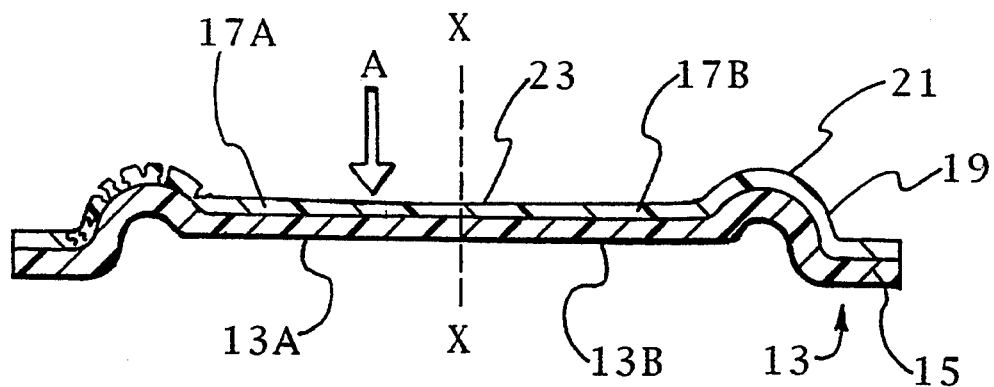

Referring now to the drawings, and in particular to FIGS. 1 and 2, there is schematically illustrated an electronic key pad, generally indicated by reference numeral 13, which key pad has been fabricated frown a polycarbonate sheet 15. The polycarbonate sheet 15 is illustrated as being coated in two sections, 13A and 13B, which sections are separated by broken line X—X. The sections 13A and 13B include abrasion-resistant coatings 17A and 17B that are, respectively, outside and within the scope of the present invention.

It should be noted that FIGS. 1 and 2 are described as schematic illustrations because they are not drawn to scale and because sections 13A and 13B are a composite representation of separately coated polycarbonate sheets.

The key pad 13 has a plurality of key members 19, each of which is delineated by a border ridge 21 that encircles a key web 23. As is best illustrated in FIG. 2, the key web 23 may be offset from the plane of the polycarbonate sheet disposed exteriorly of the border ridges 21. Thus, the key web 23 may readily be depressed in the direction of arrow A to actuate a switching means associated therewith (not shown). Upon release, the elastic nature of the polycarbonate sheet 15 will cause key web 23 to return to its unstressed configuration, as is illustrated in FIG. 2. In normal use, then, key web 23 undergoes repeated contact and flexure.

The electronic key pad 13 may be fabricated by first coating the polycarbonate sheet 15 with compositions for forming coatings 17A and 17B and curing the same. Thereafter the coated sheet may be embossed to form the border ridges 21 which delineate the key webs 23. As illustrated, the polycarbonate sheet 15 and the cured coating composition of the invention 17B, withstand the embossing process without cutting or cracking. This should be compared to the illustrated coating composition outside the scope of the invention 17A, which clearly shows cracks and fissures developed at the border ridge 21. Repeated flexure of the key web 23 is known to exacerbate this condition as well as causing rapid wear to the coating 17A over the key web 23.

It is well-known in the art that polycarbonate sheet can withstand modest embossing, without cutting or cracking. The tendency of any sheet material to cut or crack during an embossing process is, of course, related to numerous factors including the deformability of the sheet material as well as the depth of embossing and the radius of the embossing tool. Previous to the present invention, however, it has not been possible to satisfactorily emboss a polycarbonate sheet coated with an abrasion-resistant coating without obtaining the condition illustrated at 17A, FIG. 2.

The present invention permits the coating of a polycarbonate sheet with an abrasion-resistant coating, which coating does not crack or spall on embossing. In short, the present invention provides a novel composition which has the ability to undergo substantial deformation without cracking but which also retains an unexpectedly high level of abrasion resistance.

In the composition of the invention, component (A) comprises at least one acrylate monomer which contains two or more functional groups selected from the group consisting of acryloxy and methacryloxy groups.

These multifunctional acrylate monomers may be used singly or in combination with other multifunctional acrylate monomers. Some preferred multifunctional acrylate monomers useable as component (A) include: the following diacrylates 1,6-hexanediol diacrylate,
1,4-butanediol diacrylate,
ethylene glycol diacrylate,
diethylene glycol diacrylate,
tetraethylene glycol diacrylate,
tripropylene glycol diacrylate,
neopentyl glycol diacrylate,
1,4-butanediol dimethacrylate,
poly(butanediol) diacrylate,
tetraethylene glycol dimethacrylate,
1,3-butylene glycol diacrylate,
triethylene glycol diacrylate,
triisopropylene glycol diacrylate,
polyethylene glycol diacrylate, and
bisphenol A dilnethacrylate;
the following triacrylates trimethylolpropane triacrylate,
trimethylolpropane trimethacrylate,
pentaerythritol monohydroxy triacrylate, and
trimethylolpropane triethoxy triacrylate;
the following tetraacrylates pentaerythritol tetraacrylate, and
di-trimethylolpropane tetraacrylate;
and a pentaacrylate known as
dipentaerythritol (monohydroxy) pentaacrylate.
These multifunctional acrylate monomers are commercially available from Aldrich Chemical Company, Inc., Milwaukee, Wis.

The second component (B) of the composition of the invention is an aminofunctional silane of the general formula:

wherein
R is an alkoxy or alkyl group having 1 to 4 carbon atoms, which R groups may be the same or different;
R' is an alkoxy group;
Q is a divalent hydrocarbon group; and
Z is hydrogen or a monovalent hydrocarbon group;
Examples of aminofunctional silanes useful for formulating the composition of tile invention include:

3-aminopropyltriethoxysilane;
3-aminopropyltrimethoxysilane; and
3-aminopropylmethyldimethoxysilane.
These aminofunctional silanes are commercially available from Hulls America, Inc., Bristol, Pa.

The third component (C) of this composition comprises silica in the form of a colloidal dispersion. Colloidal silica is a dispersion of submicron-sized silica ($SiO_2$) particles in an aqueous or other solvent medium. The colloidal silicas used in this composition are dispersions of submicron size silica ($SiO_2$) particles in an aqueous or organic solvent or combination thereof. Colloidal silica is available in acidic or basic form. Although either form may be utilized, basic colloidal silicas must first be acidified, by means such as an organic acid, lest the solution for forming the composition of the invention gels or the silica precipitates from colloidal dispersion. Examples of satisfactory colloidal silicas for use in the composition of the invention are Nalco 1034A, Nalco 1057 and Nalco 1129 all of which can be obtained from Nalco Chemical Company, Naperville, Ill.

Nalco 1034A has a mean particle size of 20 nm and an $SiO_2$ content of approximately 34% by weight in water with a pH of approximately 3.1. Nalco 1057 has a mean particle size of 20 nm and an $SiO_2$ content of approximately 30% by weight in a solution of propoxyethanol. Nalco 1129 has a mean particle size of 20 nm and an $SiO_2$ content of approximately 30% by weight in a solution of 40% 2-Propanol (IPA) and 30% water. As reported herein the weight percents of colloidal silica in the composition of the invention do not include the weight of liquid dispersant.

The fourth component of the composition of the invention (D) is one or more acrylate-terminated polyalkylene oxides. Examples of acrylate-terminated polyalkylene oxides that are useable in the present invention include:

diethyleneglycol diacrylate ("DEGDA");
tetraethyleneglycol diacrylate ("TEGDA"); and
polyethyleneglycol diacrylate ("PEGDA").

The DEGDA, TEGDA and PEGDA monomers are all available from Sartomer Company, Inc. of Exton, Pa. and sold under the names Sartomer ® 230, 268 and 344, respectively. It should be noted that DEGDA, TEGDA and PEGDA all differ by the number of ethylene oxide groups between the acrylate terminals of the monomers. Thus, a convenient way to designated the length of the monomer is with reference to the number of carbon atoms between the acrylate terminals ("$C_n$"). DEGDA, TEGDA and PEGDA have $C_n=4$, 8 and 16, respectively.

Other acrylate-terminated polyalkylene oxides available from Sartomer Company, Inc. that are useful for formulating the composition of the invention include Sartomer ® 2,000, also referred to as $C_{14}$ diol ($C_n=14$), and Sartomer ® 9035 triacrylate, or simply as alkoxyacrylate ($C_n=24$).

It will be recognized by those skilled in the art that a mixture or blend of different species of acrylate-terminated polyalkylene oxides will yield a composition wherein the mean value of $C_n$ will be somewhere between that of the highest and the lowest $C_n$ of the components in the blend or mixture. Calculation of the exact value of $C_n$ for the mixture or blend can be carried out knowing the mole fractions of the constituent acrylate-terminated polyalkylene oxides, but is largely unnecessary as it is directly proportional to the relative weights of the constituents.

In the preferred method of the invention the multifunctional acrylate (A) is dissolved in a polar solvent, such as isopropyl alcohol. The aminofunctional silane (B) is then slowly added to the solution under conditions of constant agitation.

The multifunctional acrylate (A) and the aminofunctional silane (B) react according to a known mechanism forming a Michael adduct. The molar ratio of components (A):(B) must be such that component (A) is present in an amount greater than a two-to-one Michael adduct equivalency. Because one amine groups reacts with one acrylate group to form a Michael adduct, and because it is desirable to have at least one unreacted acrylate group on the Michael adduct to effect curing of the composition of the invention, a one-to-one molar ratio of a diacrylate to an monoaminofunctional silane yields a two-to-one Michael adduct equivalency. In the preferred composition of the invention, the Michael adduct equivalency between components (A) and (B) is about 10:1.

The Michael reaction between components (A) and (B) is preferably carried out at room temperature to prevent thermal degradation of the acrylate functionality. Components (A) and (B) should be permitted to react to substantial equilibrium, which, at room temperature, requires anywhere from about one to seventy two hours.

Even though the amine in component (B) is permitted to react to substantial equilibrium, the amino groups in the Michael adduct cause the solution to exhibit residual alkalinity. This residual alkalinity can be neutralized by the addition of an appropriate amount of an acid, such as acetic or acrylic acid. Without such acid neutralization, the subsequent addition of colloidal silica causes gelling of the composition or the precipitation of the silica particulate from dispersion. When adding an acidic colloidal silica dispersion to the composition of the invention, such as Nalcoag 1034A (pH=3.1), the solution of the Michael adduct and polar solvent should be acid-neutralized to a pH of less than 7 and preferably in the range of 5 to 6, to avoid the aforesaid gelling or precipitation.

After acid-neutralization, the colloidal silica, in the liquid dispersion, is slowly added to the solution under conditions of constant agitation.

Finally, before the volatiles (ie. isopropyl alcohol and colloidal silica dispersant) are stripped from the solution, the final component (D), one or more acrylate-terminate polyalkylene oxides, is added to the composition.

It is important to note that component (D) is added to the solution prior to stripping. It is known in the art to use certain acrylate-terminated polyalkylene oxides to adjust the viscosity of UV-curable abrasion-resistant coatings. In the prior art, however, the aforesaid has been added to the coating compositions after the solution has been stripped to form the final composition. (See, for example, the aforementioned patent to Chung, at col. 10 lines 63–66.) The present inventors have discovered that by making an addition of certain acrylate-terminated polyalkylene oxides before stripping, the tendency of tile composition to gel upon stripping can be greatly reduced.

The present inventors have further discovered that in the preparation of the composition of the present invention, the turbidity of the solution during the stripping step is directly related to the tendency of the solution to gel.

Referring now to FIG. 3, there is shown a graph of relative turbidity vs. time during stripping for two solutions adapted for producing compositions in accordance with the invention. The measure of turbidity is made relative to a standard and expressed simply as an index. As reported herein, turbidity was measured on a Series 965 Digital Direct-Reading Turbidmeter (available from Orbeco Analytical Systems, Inc. of Farmingdale, N.Y. 11735) and in accordance with the instructions provided therewith.

Solution A was produced by dissolving 21.7 gm trimethylolpropane triacrylate TMPTA, 7.8 gm 1,6-hexanediol diacrylate HDDA [component (A)] and 0.04 gm. butylated hydroxytoluene (BHT) in 55 gm of isopropyl alcohol (IPA). BHT and also phenothiozene (PTZ) are known in the art as inhibitors that prevent autopolymerization of component (A). The solution was mixed for about 15 minutes and 6.24 gm of a,ninopropyltriethoxysilane (APTES) [component (B)] was slowly added thereto under conditions of agitation. This solution was permitted to mix for about 60 minutes before 6.86 gm of acrylic acid was slowly added. The acrylic acid was added to neutralize the residual alkalinity imparted by the aminofunctional silane, bringing the pH of the solution down from about 9 to between 5 and 6. Thereafter 64.5 gm of Nalcoag 1034 A (having a silica content of 21.9 gm) [component (C)] and 20 more gm of IPA were added to the solution which was then mixed for an additional 60 minutes. This yielded a final solution having a pH between about 4 and 6 which was finally vacuum stripped of 118 gm of volatiles at a pressure of about 24–29 mm Hg and at a temperature of about 70° C. The turbidity of the solution was measured during stripping.

Solution B was prepared in a manner identical to that of Solution A except that 12.9 gm. of TEGDA [component (D)], which has $C_n=8$, was added to the solution prior to carrying out the stripping step and turbidity measurement.

FIG. 3 shows that during the stripping step, the turbidity of Solution A clearly increased from its initial value, reached a peak about half-way through the stripping step and finally fell off to a substantially constant value. The turbidity of Solution B, on the other hand, never appreciably increased during the stripping step but decreased after about 20 minutes and leveled off to a substantially constant value after about 40 minutes. The end product of Solution B is a composition in accordance with the invention.

Because the turbidity of the solutions during stripping is directly related to the tendency of the solutions to gel, Solution B exhibits substantially greater stability than Solution A. It should be understood, however, that if Solution A is successfully stripped without gelling, then an identical addition of TEGDA thereto, after stripping, would also yield the deformable coating composition of the invention.

After stripping, other components can be added to the compositions in order to enhance the usefulness of the coatings. For example, known diluents (to adjust viscosity), leveling agents, photoinitiators, ultraviolet light absorbers, dyes and the like, can be included. Thereafter, the coating composition of the invention is used to coat a desired substrate and the composition is cured by known means, such as exposure to heat, ultraviolet radiation or an electron beam.

Several experimental compositions were prepared in accordance with the method of the invention to determine the formulation limits of the composition of the invention. The behavior of the solutions used to prepare the experimental compositions was observed during stripping. The resultant compositions were then applied to polycarbonate sheet and Taber test panel substrates and subsequently cured by ultraviolet radiation. Finally, the properties of abrasion resistance and deformability were measured and correlated with the relative amount of acrylate-terminated polyalkylene oxides and the mean number of carbons ($C_n$) between the acrylates in the acrylate-terminated polyalkylene oxides.

Deformability

The deformability of the experimental compositions is directly related to the elongation the coating can withstand without exhibiting signs of cracking or spalling from a substrate. Accordingly, a polycarbonate sheet 0.011 inch (0.02794 cm) thick was coated with the experimental compositions to yield a 3 to 5 micron thick cured coating. Strips 1⅛ inch (2.8375 cm) wide were cut from the coated sheet. The strips were then sequentially bent 180° over cylindrical mandrels of successively smaller diameters. The bending was carried out with the uncoated surface in contact with the mandrel surface. After each bend, the coating was visually inspected for any signs of cracking with the aid of a ten power Jeweler's loop.

The percent elongation (% el.) of the coated test strips is reported herein as a range. The range is based upon the smallest diameter mandrels wherein the above bend test respectively produced no visible cracks and the first appearance of cracking. Accordingly, it can be assumed that the % el. which a given coating composition can withstand without cracking, is somewhere between the two reported values.

The following formula was used to calculate numerical values for % el. The formula assumes: the thickness of the coating is negligible compared to the thickness of the underlying polycarbonate specimen; frictionless contact between the specimen and the mandrel; and a neutral stress plane at one-half the thickness of the specimen.

$$\% \, el. = 100 \times T/(D+T)$$

where

T = the thickness of the polycarbonate sheet; and
D = the diameter of the mandrel.

Reported below are the mandrel diameters used and the corresponding % el produced in the coating of the inventive compositions by the guided bend test.

| D inch (cm)    | % el. |
| -------------- | ----- |
| 1.00 (2.54)    | 1.1   |
| 0.750 (1.91)   | 1.4   |
| 0.612 (1.55)   | 1.7   |
| 0.500 (1.27)   | 2.2   |
| 0.375 (0.953)  | 2.8   |
| 0.312 (0.792)  | 3.3   |
| 0.250 (0.635)  | 4.2   |
| 0.187 (0.475)  | 5.2   |
| 0.154 (0.391)  | 6.7   |
| 0.125 (0.318)  | 8.1   |
| 0.094 (0.239)  | 10.5  |

Abrasion Testing (Taber Test)

Abrasion resistance was determined according to ASTM Method D-1044. The instrument used was a Teledyne model 503 Taber Abrader with two 250 gram auxiliary weights (500 gram load) for each of the CS10F abrasive wheels. The acrylic and polycarbonate test panels were subjected to 100 and 500 cycles on the abrader turntable (T-100 and T-500, respectively). The percent change in haze which is the criterion for determining the abrasion resistance of the coating was determined by measuring the difference in haze of the unabraded and abraded coatings. Haze is defined as the percentage of transmitted light which, in passing through the sample, deviates from the incident beam by forward scattering. In this method, only light flux that deviates more than 2.5 degrees on the average is considered to be haze. The percent haze on the coatings was determined by ASTM Method D-1003. A Gardner Haze Meter was used and the haze was calculated by measuring the amount of diffused light, dividing by the amount of transmitted light and multiplying by one hundred.

Experimental Compositions

Table 1 (below) reports the various experimental compositions that were prepared to determine the scope of the invention. Each composition was prepared in accordance with the procedure and proportions described above for Solution B, except that the amount and $C_n$ of component (D), the acrylate-terminated polyalkylene oxides, was varied as shown. After stripping, vinyl acetate (VA) was used as a diluent to adjust the viscosity of the compositions and 0.84 gm of a photoinitiator (Darocure® 1173 from Ciba-Geigy, Inc. of Hawthorne N.Y.) and a 0.42 gm of a synergist (Uvitone® 8303 from Upjohn of North Haven, Conn.) were added. The experimental compositions were then applied to the polycarbonate sheet and Taber test panels for deformability and abrasion resistance testing. UV curing was carried out using a belt fed UV oven set at 300 watts with a belt speed of 6 ft. (1.83 m) per minute (available from Hanovia, Inc. of Newark, N.J.).

Finally, for a comparison example (designated as Composition No. 19 in Table 2), a solution was prepared in accordance with the procedure and proportions described in connection with Solution A, to which was added 12.9 gm methylmethacrylate.

TABLE I

| Comp. No. | Acrylate-Terminated Polyalkylene Oxides (gm) | | | | | VA |
| --- | --- | --- | --- | --- | --- | --- |
| | DEGDA | TEGDA | $C_{14}$ diol | PEGDA | Alkoxy Acrylate | |
| 1  | 12.9 |      |      |      |      | 3.2 |
| 2  | 6.45 | 6.45 |      |      |      | 6.4 |
| 3  | 6.45 | 6.45 |      |      |      |     |
| 4  | 6.45 |      | 6.45 |      |      | 6.4 |
| 5  | 6.45 |      | 6.45 |      |      |     |
| 6  | 6.45 |      |      | 6.45 |      | 3.2 |
| 7  | 6.45 |      |      |      | 6.45 | 3.2 |
| 8  |      | 12.9 |      |      |      | 6.4 |
| 9  |      | 6.45 | 6.45 |      |      | 3.2 |
| 10 |      | 6.45 |      |      | 6.45 | 6.4 |
| 11 |      | 6.45 |      |      | 6.45 |     |
| 12 |      |      | 12.9 |      |      | 6.4 |
| 13 |      |      | 6.45 | 6.45 |      | 6.4 |
| 14 |      |      | 6.45 | 6.45 |      |     |
| 15 |      |      |      | 12.9 |      | 6.4 |
| 16 |      |      |      | 6.45 | 6.45 | 3.2 |
| 17 |      |      |      |      | 12.9 | 6.4 |
| 18 | 19.2 |      |      |      |      | 6.4 |
| 19 | no component (D) but includes 12.9 gm methylmethacrylate | | | | | |

TABLE 2

| Comp. No. | $C_n$ | Haze | % el. | T-100 | T-500 |
| --- | --- | --- | --- | --- | --- |
| 1  | 4    | 0.73 | 4.2/5.3  | 2.1 | 6.5  |
| 2  | 4/8  | 1.73 | 6.7/8.1  | 1.6 | 5.3  |
| 3  | 4/8  | 2.27 | 6.7/8.1  | 1.2 | 5.0  |
| 4  | 4/14 | 0.80 | 8.1/10.5 | 2.7 | 10.3 |
| 5  | 4/14 | 1.03 | 5.3/6.7  | 4.2 | 11.2 |
| 6  | 4/16 | 1.37 | 8.1/10.5 | 2.0 | 6.8  |
| 7  | 4/24 | 0.70 | 8.1/10.5 | 2.3 | 8.7  |
| 8  | 8    | 1.03 | *        | 1.4 | 5.0  |
| 9  | 8/14 | 0.83 | 8.1/10.5 | 3.8 | 13.3 |
| 10 | 8/24 | 1.07 | 8.1/10.5 | 2.1 | 7.5  |
| 11 | 8/24 | 1.50 | 8.1/10.5 | 2.6 | 7.9  |

TABLE 2-continued

| Comp. No. | $C_n$ | Haze | % el. | T-100 | T-500 |
|---|---|---|---|---|---|
| 12 | 14 | 3.25 | 5.3/6.7 | 5.2 | 5.5 |
| 13 | 14/16 | 2.23 | 8.1/10.5 | 4.8 | 12.5 |
| 14 | 14/16 | 1.40 | 6.7/8.1 | 5.8 | 12.7 |
| 15 | 16 | 1.07 | 5.3/6.7 | 3.4 | 14.1 |
| 16 | 16/24 | 1.40 | 8.1/10.5 | 3.0 | 12.7 |
| 17 | 24 | 2.00 | * | 3.5 | 15.85 |
| 18 | 4 | 1.83 | 4.2/5.3 | 4.2 | 9.84 |
| 19 | 0 | 1.20 | 1.1/1.4 | 2.7 | 5.2 |

*not measured

Referring now to Tables 1 and 2, it can be readily seen that the use of acrylate-terminated polyalkylene oxides, component (D), in accordance with the invention, yields a novel composition capable of curing to form a deformable and abrasion-resistant coating.

In choosing limitations of the present invention with respect to deformability, consideration was given to observed results from a test embossing process. A polycarbonate sheet coated with Composition No. 1, which exhibited between 4.2 and 5.3% elongation, could not be embossed to a satisfactory degree without exhibiting the cracking illustrated in FIG. 1. Composition No. 2, however, which exhibited between 6.7 and 8.1% el., could be embossed to a satisfactory degree. Accordingly, it is believed that for purposes of embossing, the abrasion-resistant coating of the invention should exhibit a % el. in excess of about 5%.

The measurement of abrasion resistance, as relates to coatings, is well-known in the art. A coating that exhibits a Taber 100 test result of about 5 or less and a Taber 500 test result of about 10 or less is known to possess substantial abrasion-resistant properties.

Composition No. 19, the comparison example, which was formulated without using any of component (D) but substituting therefor methyl methacrylate, renders an abrasion-resistant coating but not one that is considered deformable in accordance with the invention. Likewise, Composition Nos. 1, 9, 14, 15, 16 and 17 fail to exhibit one or the other of the desired properties, i.e., deformability or abrasion resistance. Composition Nos. 4, 5 and 13 exhibit only marginal performance, showing slightly less abrasion resistance than desired as measured by the T-500 abrasion test.

Composition Nos. 6, 7, 10, 11 and 12, on the other hand, show excellent abrasion resistance combined with high deformability. Likewise, Composition Nos. 2 and 3 exhibit good results.

Correlating the results of deformability and abrasion testing with the mean number of carbons between the acrylate terminals in component (D), $C_n$, it becomes readily apparent that longer-chained acrylate-terminated polyalkylene oxides promote deformability but at the expense of abrasion resistance. Although very satisfactory results can be obtained from the judicious use of a single acrylate-terminated polyalkylene oxide (see for example Composition No. 12), the use of a blend of a relatively short-chained and long-chained acrylate-terminated polyalkylene oxides can unexpectedly allow the composition of the invention to simultaneously maximize the conflicting properties of deformability and abrasion resistance. This is illustrated by comparing the low % el. but good abrasion resistance of Composition No. 1 (obtained by using only a short-chained acrylate-terminated polyalkylene oxide $C_n=4$), the low abrasion resistance of Composition No. 17 (obtained by using only a long-chained acrylate-terminated polyalkylene oxide $C_n=24$) and the good abrasion resistance and good % el. of Composition No. 7 (obtained by using a combination of long- and short-chained acrylate-terminated polyalkylene oxides wherein $C_n$ is between 4 and 24).

When component (D) consists of a blend of at least two different acrylate-terminated polyalkylene oxides having differing values of $C_n$, it appears that the most desirable results occur when $C_n$ for the blend is a predetermined number between 4 and 24.

While Tables 1 and 2 illustrate that the coating compositions of the present invention are deformable yet abrasion-resistant, further experiments were conducted to determine whether there is an upper and lower limit on the amount of component (D) that can or needs to be added to the coating compositions described herein. As previously mentioned, the method of the invention calls for adding component (D) to the solution prior to the stripping step to prevent gelling. Accordingly, various compositions were prepared in accordance with the procedure and proportions described in connection with Solution B, except that component (D) consisted entirely of DEGDA and the amount was varied between 0.0 and 25.8 gm. The behavior of the solutions was observed during tile stripping step and the resultant compositions were tested for abrasion resistance. The results are reported below in Table 3.

TABLE 3

| grams DEGDA | 0.0 | 1.0 | 3.2 | 6.4 | 12.9 | 19.2 | 25.8 |
|---|---|---|---|---|---|---|---|
| Strip | gel | poor | good | good | good | good | good |
| T-100 | — | 1.1 | 3.8 | 1.2 | 2.1 | 4.2 | 7.8 |
| T-500 | — | 5.1 | 10.0 | 4.5 | 5.9 | 9.8 | 16.9 |

From the results disclosed in Table 3 it is evident that the addition of component (D) aids in preventing gelling of the compositions during the stripping step, without regard to an upper limit. It should be noted that even a small quantity of the acrylate-terminated polyalkylene oxide (i.e. 1 gm of DEGDA) prevented gelling during the stripping step. On the other hand, it is clear from Table 3 that increased amounts of component (D) tend to reduce the abrasion resistance of the cured coatings, as measured by the Taber abrasion tests. Thus, enough of component (D) should be used to prevent gelling during the stripping step but not so much that abrasion resistance is sacrificed.

Finally, it should be noted that component (A), a multifunctional acrylate monomer, and component (D), one or more acrylate-terminated polyalkylene oxides, can be chemically identical. Nonetheless, even if chemically identical, those skilled in the art will recognize that the function performed by components (A) and (D) differ substantially. At least a portion of the acrylate functionality of component (A) is used to form a Michael adduct, whereas the acrylate functionality of component (D) is used exclusively for final curing of the coating composition. Furthermore, the polyalkylene oxide units of component (D) are believed to impart the coating composition with its deformable characteristics, without sacrificing abrasion resistance, regardless of the exact chemical structure of component (A).

Although various examples have been used herein to illustrate the composition and method of the invention, and various features and advantages of the composition and method of the invention have been described herein, the scope of the invention should be interpreted only from the following claims and equivalents thereof.

What is claimed is:

1. A composition for forming a deformable, abrasion-resistant coating on a substrate, said composition comprising:
   (A) at least one multifunctional acrylate monomer;
   (B) an aminofunctional silane having the following formula:

wherein
   R is an alkoxy or alkyl group having 1 to 4 carbon atoms, which R groups may be the same or different;
   R' is an alkoxy group;
   Q is a divalent hydrocarbon group; and
   Z is hydrogen or a monovalent hydrocarbon group;
   said multifuntional acrylate monomer (A) being present in an amount greater than a two-to-one Michael adduct equivalency with respect to said aminofunctional silane (B);
   substantially all of said aminofunctional silane (B) being reacted with said multifunctional acrylate monomer (A) to form a Michael adduct therefrom;
   (C) colloidal silica; and
   (D) one or more acrylate-terminated polyalkylene oxides;
   said acrylate-terminated polyalkylene oxides (D) having a predetermined mean number of carbons between said acrylate terminals, $C_n$;
   said composition including a predetermined weight percent of component (D), relative to the aggregate weights of components (A), (B) (C) and (D); and
   wherein said $C_n$ and said predetermined weight percent of component (D) yield a cured coating composition that exhibits a Taber 100 number of about 5 or less, a Taber 500 number of about 10 or less and elongation of more than about 5%.

2. A composition in accordance with claim 1 wherein said component (D) is a an aliphatic acrylate-terminated polyalkylene oxide having a predetermined value of $C_n$ of between 4 and 24.

3. A composition in accordance with claim 1 wherein the Michael adduct equivalency between Components (A) and (B) is between 2:1 and 10:1.

4. A composition in accordance with claim 1 wherein said predetermined weight percent of component (D) about 17%.

5. A composition in accordance with claim 1 wherein component (A) is selected from the group consisting of: 1,6-hexanediol diacrylate; 1,4-butanediol diacrylate; ethylene glycol diacrylate; diethylene glycol diacrylate; tetraethylene glycol diacrylate; tripropylene glycol diacrylate; neopentyl glycol diacrylate; 1,4-butanediol dimethacrylate; poly(butanediol) diacrylate; tetraethylene glycol dimethacrylate; 1,3-butylene glycol diacrylate; triethylene glycol diacrylate; triisopropylene glycol diacrylate; polyethylene glycol diacrylate; bisphenol A dimethacrylate; trimethylolpropane triacrylate; trimethylolpropane trimethacrylate; pentaerythritol monohydroxy triacrylate; trimethylolpropane triethoxy triacrylate; pentaerythritol tetraacrylate; and ditrimethylolpropane tetraacrylate; dipentaerythritol (monohydroxy) pentaacrylate; and mixtures thereof.

6. A composition in accordance with claim 1 wherein component (B) is selected from the group consisting of: 3-aminopropyltriethoxysilane; 3-aminopropyltrimethoxysilane; 3-aminopropylmethyldimethoxysilane; and mixtures thereof.

7. A composition in accordance with claim 1 wherein component (D) is selected from the group consisting of: diethyleneglycoldiacrylate; tetraethyleneglycoldiacrylate; polyleneglycoldiacrylate having a $C_n$ of 16; acrylate-terminated polyalkylene oxide having a $C_n$ of 14; ethoxylated trimetholpropanetriacrylate having a $C_n$ of 24; and mixtures thereof.

8. A composition in accordance with claim 1 further comprising effective amounts of a photoinitiator and a synergist.

9. An article of manufacture comprising a substrate having an abrasion-resistant coating formed on at least one surface thereof, said coating being formed from a cured formulation comprising:
   (A) at least one multi functional acrylate monomer;
   (B) an aminofunctional silane having the following formula:

wherein
   R is an alkoxy or alkyl group having 1 to 4 carbon atoms, which R groups may be the same or different;
   R' is an alkoxy group;
   Q is a divelent hydrocarbon group; and
   Z is hydrogen or a monovalent hydrocarbon group;
   said multifunctional acrylate monomer (A) being present in an amount greater than a two-to-one Michael adduct equivalency with respect to said aminofunctional silane (B);
   substantially all of said aminofunctional silane (B) being reacted with said multifunctional acrylate monomer (A) to form a Michael adduct therefrom;
   (C) colloidal silica; and
   (D) one or more acrylate-terminated polyalkylene oxides;
   said acrylate-terminated polyalkylene oxides (D) having a predetermined mean number of carbons between said acrylate terminals, $C_n$;
   said composition including a predetermined weight percent of component (D), relative to the aggregate weights of components (A), (B) (C) and (D); and
   wherein said $C_n$ and said predetermined weight percent of component (D) yield a cured coating composition that exhibits a Taber 100 number of about 5 or less, a Taber 500 number of about 10 or less and elongation of more than about 5%.

10. An article in accordance with claim 9 wherein said substrate is an embossable sheet material.

11. An article in accordance with claim 10 further comprising said coated sheet material being embossed to delineate at least one ridge thereon.

12. An article in accordance with claim 10 wherein said embossable sheet material is made from a polycarbonate.

* * * * *